United States Patent [19]

Templeton et al.

[11] Patent Number: 5,692,126

[45] Date of Patent: Nov. 25, 1997

[54] ISDN ACCESS TO FAST PACKET DATA NETWORK

[75] Inventors: Thomas N. Templeton, Bel Air; John L. Burke, Joppatowne, both of Md.

[73] Assignee: Bell Atlantic Network Services, Inc., Arlington, Va.

[21] Appl. No.: 377,565

[22] Filed: Jan. 24, 1995

[51] Int. Cl.$^6$ .................................................. H04L 12/46
[52] U.S. Cl. ........................ 395/200.02; 364/242.94; 364/242.95; 364/242.96; 395/200.21
[58] Field of Search ............................. 370/60, 85.13, 370/94.1, 110.1, 53–68.1, 85.1, 85.5, 85.9, 85.12–85.15; 379/90, 93, 219–228; 395/200.01, 200.02, 200.12, 200.21, 306, 311, 800

[56] References Cited

U.S. PATENT DOCUMENTS

| | | | |
|---|---|---|---|
| 4,594,705 | 6/1986 | Yahata et al. | 370/67 |
| 4,710,769 | 12/1987 | Friedman et al. | 340/825.03 |
| 4,757,267 | 7/1988 | Riskin | 379/113 |
| 4,958,341 | 9/1990 | Hemmady et al. | 370/60.1 |
| 4,970,723 | 11/1990 | Lin | 370/110.1 |
| 5,008,884 | 4/1991 | Yazawa et al. | 370/110.1 |
| 5,073,923 | 12/1991 | Offers | 379/165 |
| 5,113,499 | 5/1992 | Ankney et al. | 340/825.34 |
| 5,151,896 | 9/1992 | Bowman | 370/85.13 |
| 5,208,811 | 5/1993 | Kashio et al. | 370/94.1 |
| 5,225,976 | 7/1993 | Tawil | 364/401 |
| 5,271,058 | 12/1993 | Andrews et al. | 379/210 |
| 5,276,679 | 1/1994 | McKay et al. | 370/84 |
| 5,301,105 | 4/1994 | Cummings, Jr. | 364/401 |
| 5,341,374 | 8/1994 | Lewen et al. | 370/85.4 |
| 5,373,550 | 12/1994 | Campbell et al. | 379/100 |
| 5,408,527 | 4/1995 | Tsutsu | 379/211 |
| 5,442,630 | 8/1995 | Gagliardi | 370/85.13 |
| 5,455,855 | 10/1995 | Hokari | 379/229 |
| 5,500,934 | 3/1996 | Austin et al. | 395/155 |
| 5,521,909 | 5/1996 | Holloway et al. | 370/54 |
| 5,521,914 | 5/1996 | Mavraganis et al. | 370/60 |
| 5,546,378 | 8/1996 | Wirta et al. | 370/16.1 |
| 5,561,669 | 10/1996 | Lenney et al. | 370/60.1 |

OTHER PUBLICATIONS

Stan Schatt, Understanding Local Area Networks, p. 128 (3d ed. 1992).

John D. Bray, The Resurgence of Centrex, Telecommunications, pp. 81, 83 & 85–86 (Sep. 1985).

Kanagedra, Centrex, In Telecommunications Engineer's Reference Book §35 (1993).

*Primary Examiner*—Lance Leonard Barry
*Attorney, Agent, or Firm*—Lowe, Price, LeBlanc & Becker

[57] ABSTRACT

A Health Care Information Network is provided that allows subscribers access to a data center. A LAN arranged at the data center is connected through a frame relay network to a LAN of a similar type located at a central office. ISDN/LAN bridges link the LAN to an ISDN switch that provides the subscribers with ISDN Centrex services. A PC at the subscriber's site can gain the subscriber access to the ISDN switch via an ISDN Centrex line. The subscribers are provided with voice, image and data transmission, and can communicate not only with the data center but with each other. For disaster recovery, e.g., if a connection is broken or defective, the network can provide alternative routes. A network manager at the data center is able to configure the network, monitor its status and react to failures and overloads on a real time basis.

40 Claims, 5 Drawing Sheets

ISDN ACCESS TO FAST PACKET DATA NETWORK

TECHNICAL FIELD

This invention relates to integrated voice and data communication networks, and more particularly, to an information system that uses an integrated service digital network (ISDN) and a high speed data network such as Frame Relay to provide subscribers with ISDN Centrex services.

BACKGROUND ART

Widespread access to centrally located data bases has been provided by interconnection of a plurality of data networks having associated protocols. Various prior art arrangements permit transmission of data at high speeds over public data networks. U.S. Pat. No. 5,113,499, granted to Ankney et al., describes a security access management system for a packet switched data communications network. Each entry point of the network has an access management apparatus that includes a host processor for examining user terminal authorization information in packets received at the associated packet switch for transmission through the network to the destination addresses for the packets. A database associated with the administrative host stores information including levels of authorization of the user terminals for the respective entry point of the network for access to specified destinations as preassigned by the network customer. U.S. Pat. No. 5,208,811, granted to Kashio et al., describes an interconnection system for different networks such as a LAN network and a terminal of an integrated service digital network (ISDN). An "inter-working unit" conducts a translation between a LAN protocol and an ISDN protocol.

A need exists to provide a large number of users, located over a wide geographic area, access to a centrally located data base at a high bandwidth and high data speed rate. Such a communications network should be able to serve large, institutional size entities as well as individuals. An example is a health care information network that would provide health service providers access to a health insurance company data center at a minimum of 56k bandwidth. With improved access, the health care provider would be able to process claims, do account validation and be certain of the kind of coverage the patient has before or at the time that service is done. The claim could be processed while the patient is in the provider's office to determine the amount due the provider by the insurer and the balance owed by the patient. A significant amount of paperwork and delay, attendant with the current practice, would thus be eliminated.

U.S. Pat. No. 5,225,976, granted to Tawil, describes an automated health benefit processing system that includes a database and processor for processing health benefit claims for medical services of an insured user. The database lists, for each geographic area and for each medical procedure that can be performed, the following information: the benefit payable if the designated medical procedure is prescribed and performed, a list of providers available to perform the designated procedure and each provider's charge for performing the designated procedure. A first processor generates a treatment plan, including the identity of the insured and the medical procedure(s) to be performed. A second processor generates a treatment record, including procedures already performed, by whom and the providers' charges. A third processor determines amounts payable to the insured and to the provider.

U.S. Pat. No. 5,301,105, granted to Cummings, Jr., describes a managed health care system in which integrated interconnection and interaction is provided among patients, insurance companies and/or health care payers, employers and banks and other financial institutions. The processing system can access a substantial number of data bases.

A typical health care information network is depicted in FIG. 1, comprising a data center 32 coupled via a telephone central office 34 to various health care institutions, for example, hospitals. A station cluster controller at the data center is connected to a main port 0 of a multi-port bridge 38 provided at the central office 34. Ports 1 and 2 of the bridge are connected to station controllers 36 at the health care institutions. Each station controller 36 is coupled to terminals 1-4 located throughout the health care institution to provide a user interface to the network.

This network arrangement has drawbacks arising from its limited bandwidth and transmission speed (up to 4800 bps.) capabilities. There is no provision available for voice or image transmission. No bandwidth expansion is possible. The bridge engages one station controller at a time in communication with the data center. The network is vendor-dependent and requires specific type of equipment. For example, IBM's Systems Network Architecture (SNA) equipment may be used. The arrangement is mileage-sensitive and lacks alternate routing and dynamic allocation capabilities. The network administration is limited to loop back testing of the lines and equipment. In view of such drawbacks, it would be desirable to provide a health care information network that overcome the above-indicated drawbacks of the prior art system.

An additional desirable feature would be an enhanced system that provides user to user communication. With such functionality, a medical provider not only can access health insurance information, but can communicate with hospitals or relevant specialists to obtain medical records and diagnostic consultation. Of benefit would be transmission of test results and procedures, including data in graphic format. A system capable of providing the high bandwidth and high transmission rates that would be required for such uses would have to be an arrangement that is not cost prohibitive to smaller scale users such as individual practitioners.

DISCLOSURE OF THE INVENTION

Accordingly, one advantage of the invention is in providing a high speed data network that provides voice, image and data transmission at acceptable cost to individual users.

Another advantage of the invention is in providing a flexible health care information network having alternate routing and dynamic bandwidth allocation capabilities while allowing users to communicate with each other.

A further advantage of the invention is in providing a health care information network that allows a network manager to perform administrative and maintenance functions throughout the network from a remote position.

The above and other advantages of the invention are achieved, at least, in part, by providing a data communications network that allows user access to a remote data center. A first local area network (LAN) arranged at the data center is coupled to a fast packet network to provide interconnection between the data center and a first central office. A second LAN is arranged at the first central office for interfacing the fast packet network with an ISDN switch coupled to the user terminals via ISDN lines to provide the user terminals with Centrex services, such as speed calling and hot line services. Also, the Centrex teleconference and voice mail services are provided.

While the invention is exemplified herein by a data center that provides users with health care management information, the principles are applicable to any of various data communication network applications, such as banking and information provision.

Preferably, the fast packet network supports frame relay switching. Alternatively, a Switched Multimegabit Data Service (SMDS) network or cell relay network (ATM) may be used. The first and second LANs may operate with different protocols and be interconnected through appropriate interfaces for protocol translation.

In accordance with a first preferred embodiment of the invention, each of the first and second LANs comprises an Ethernet network. In accordance with a second preferred embodiment of the invention, each of the first and second LANs comprises a Token Ring network.

A network manager workstation may be coupled to the first LAN at the data center to perform operation and configuration management throughout the network in real time, as well as to perform administrative and maintenance functions. The network manager has access to each of the user terminals to modify their network interface parameters.

To provide Centrex services, a central office of the public switched telephone network (PSTN) is provided with the ISDN switch. The network may comprise a second central office having a Basic Rate ISDN Transmission Extension Unit coupled to the first central office to extend the Centrex services to its customers. Additional central offices having ISDN switches can be coupled via an ISDN public network to the first central office to provide associated customers with access to the data center and with the Centrex services.

The user terminals are provided with personal computers equipped with BRI ISDN cards to receive and transmit image, voice and data signals. The Centrex local and long distance calling services are available for the users to communicate not only with the data center but also with each other. By grouping individual users in the Centrex environment to be interfaced with a LAN, the expense of a T1 data line need not be incurred by an individual user.

A single Frame Relay Data Link Connection Identifier (DLCI) address may be assigned to all of the customers of each central office coupled to the Frame Relay network.

Still other advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Although the invention has general applicability in the field of data communications, the best mode for practicing the invention is disclosed in part on the realization that the information network is used to allow health care providers access to a health care management center. It is to be understood that the invention is applicable to any data communications network that provides users with access to a remote data center.

Figure 1:
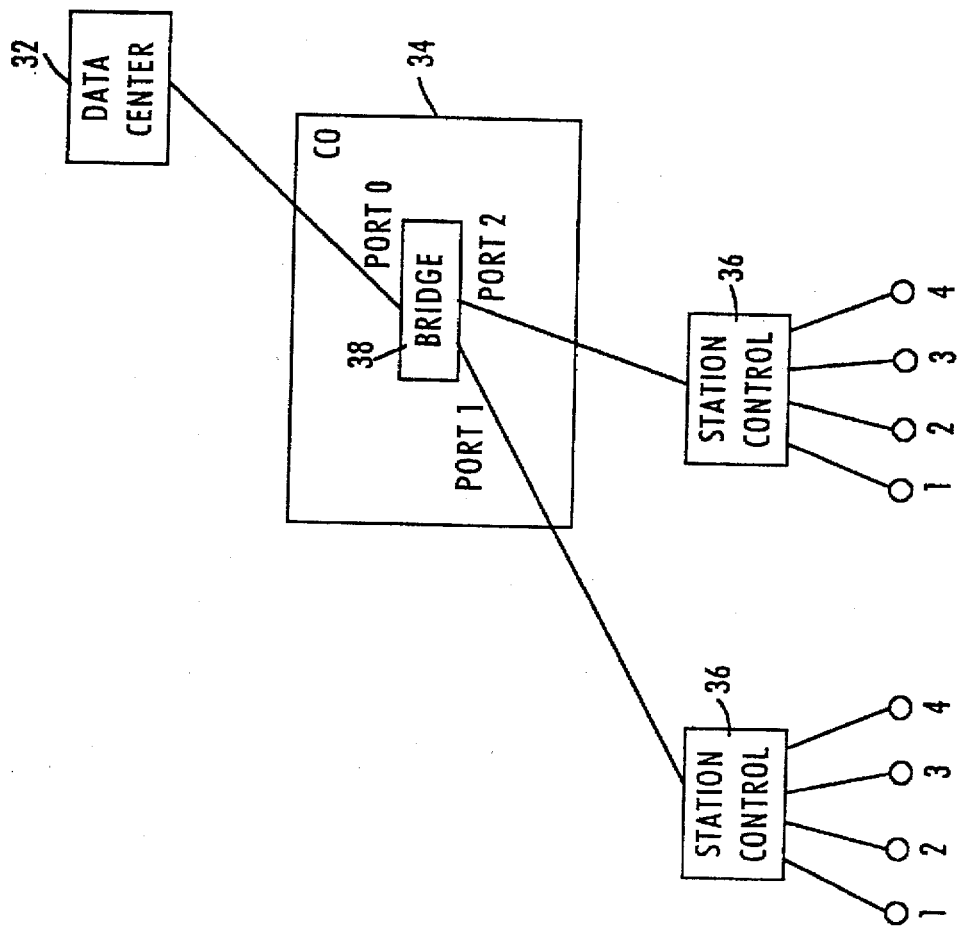
FIG. 1 is diagram of a prior art health information network.
Figure 2:
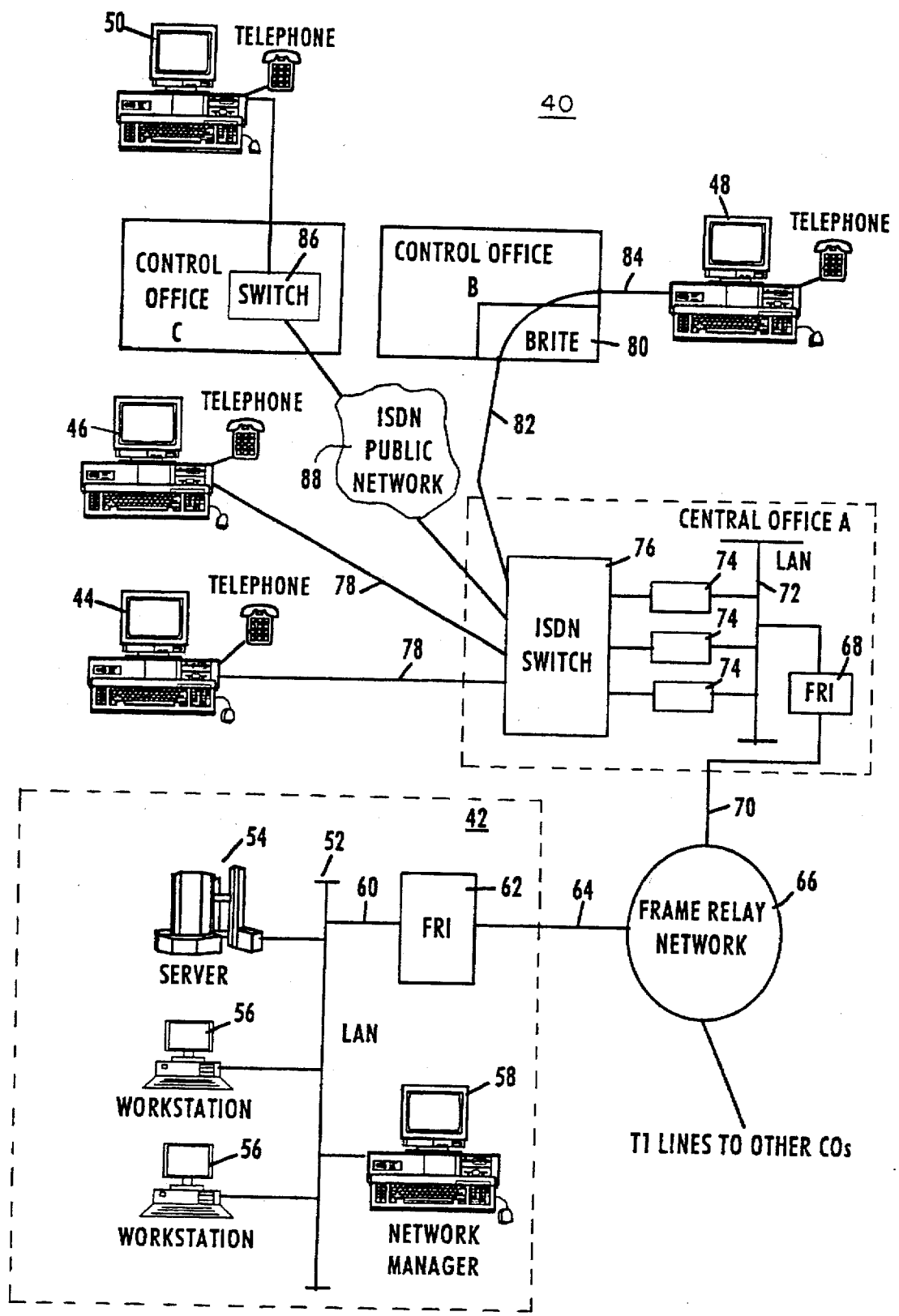
FIG. 2 is a diagram of a health care information center with ISDN coupled to Frame Relay communication in accordance with the invention.

Reference is now made to FIG. 2, showing an illustrative health care information network (HCIN) 40 that comprises a health care data center 42 interconnected with remote subscribers 44, 46, 48 and 50 via central offices (CO) A, B and C. An Ethernet type local area network (LAN) 52 is arranged at the data center 42 to provide communications between a file server 54 and workstations 56 located throughout the data center 42 to respond to subscribers' requests. A network management workstation 58 is coupled to the LAN 52 to perform network management functions throughout the HCIN 40. In particular, the network manager 58 provides operations and configuration management on a real time basis, and carries out administration and maintenance functions. The network management capabilities are disclosed in more detail later.

An Ethernet segment 60 is used to connect the LAN 52 with a Frame Relay Interface (FRI) 62 coupled via a T1 1.544 Mbps. frame relay access line 64 to a frame relay network 66. The bridging between the LAN 52 and the frame relay network 66 may be performed using any of various protocols, for example, the Transmission Control Protocol/Internet Protocol (TCP/IP). Via a gateway (not shown in FIG. 2), the LAN 52 may be connected to telephone lines that are not coupled to the frame relay network 66. It is to be understood that any type of high-speed network may be used as the network 66, for example, a cell relay network, or Switched Multimegabit Data Service (SMDS) network.

A FRI 68 is arranged at the central office A to interface the frame relay network 66 with the CO equipment. A multiplexer provided with a frame relay interface card and T1 interface card, for example Integrated Packet Exchange (IPX) multiplexer, may be used to support the frame relay interfaces FRI 62 and 66. Alternatively, a frame relay access devices (FRAD) may provide the required frame relay interface.

The frame format used for the transmission across the frame relay network is defined in the CCITT Recommendation I.441/Q921. In particular, the first and last fields of the frame serve as flags, each being one octet long. The second field is the address field taking up two octets. The third field is provided for user data and can comprise any number of integral octets up to 4096. The fourth and fifth fields are reserved for Frame Check Sequence (FCS), each one octet long. The address field is based on the ANSI T1.618 standard and includes a 10-bit Data Link Connection Identifier (DLCI) that ranges from zero to 1023. The DLCI identifies the logical channel connection within the physical channel or port for a predetermined destination. Also, the address field comprises congestion control bits that provide Forward Explicit Congestion Notification (FECN) and Backward Explicit Congestion Notification (BECN) to notify remote users of the congestion encountered by the frame transmitted across the physical medium. A Discard Eligibility bit (DE), also residing in the address field, indicates (when set to 1) that the frame should be discarded during congestion conditions. This bit is used by carriers to determine what data they will discard when the total traffic exceeds network bandwidth resources.

Each of the central offices connected to the frame relay network 66 is identified by its own DLCI address. The FRI 62 translates the Ethernet packet supplied by the LAN 52 into the frame relay frame format, and sends the frame to a destination DLCI, where the FCS is verified. If the FCS is not correct, the frame is discarded, with no indication to the network or user. If the FCS is correct and the destination node is reached, the frame is passed through the logical and physical port to the user.

Via a T1 frame relay access line 70, the frame relay frame is received by the FRI 68 that translates it back into the LAN format packet. The FRI 68 is coupled to a LAN 72 arranged at the central office A and having a topology similar to the LAN 52. If an Ethernet type local area network serves as the LAN 52 at the data center 42, the Ethernet type network is also used as the LAN 72 at the central office A. However, it is to be understood that any local area network with similar topology may be arranged at the data center 42 and central office A. For example, LANs of a token ring topology may be used. At the central office A, the same interconnection arrangement is provided between the FRI 68 and the LAN 72, as the interconnection arrangement between the FRI 62 and the LAN 52 at the health care data center 42. As the local area network arranged at the central office A is an extended appearance of the data center local area network, the LAN 72 can serve as a back-up for the LAN 52 when the data center network is out of service.

Bridges 74, incorporated into the LAN 72, provide the Ethernet LAN 72 with an interface to an ISDN switch 76 arranged at the central office A. The Ethernet bridging may be performed using the Transmission Control Protocol/Internet Protocol (TCP/IP) or other appropriate protocols. The ISDN switch 76 provides the remote subscribers with Centrex services supported by ISDN lines that couple the subscribers to the central office A. The remote subscribers can gain access through the ISDN lines to a variable sized multi-line hunt group in the central office, for connection via the bridges to the LAN 72. The arrangement that link the ISDN switch 76 with the frame relay network 66 via the LAN 72 is disclosed in more detail below.

As known in the art, a Centrex switch provides services of a digital Private Branch Exchanges (PBX). However, unlike the digital PBX, Centrex performs switching functions in equipment located in the telephone company's central office as opposed to the customer's premises. Based on the ISDN capabilities, the ISDN Centrex switch 76 provides the remote subscribers with voice, image and data transmission. A hot line service may be established to allow the subscribers to use two digit speed calling to the health care data center 42. Teleconference services like Centrex Group Voice Inter-com calling as well as a Centrex Group Circuit Switched Data Inter-com calling may be provided via the ISDN lines. Further, the subscribers are enabled to call locally or via a Long-Distance carrier not only to the data center but also to each other or to any other destinations. Enhanced Centrex services, for example a Voice Mail and Bulk Long Distance rates, are also available.

A primary rate interface (PRI) and/or a basic rate interface (BRI) may be provided between the ISDN switch 76 and each of the bridges 74. This ISDN T1 access interface comprises twenty-three B-channels each at 64 Kbps. and one D-channel at 64 Kbps. The subscriber terminals 44 and 46 are coupled to the ISDN switch 76 via ISDN BRI lines 78. This ISDN access interface comprises two B-channels each at 64 Kbps and one D-channel at 16 Kbps. One of the B-channels may be used for image and digital data transmission, and another for voice communication.

Each of the subscriber terminals comprises a personal computer equipped with a BRI network access card coupled to the ISDN BRI line to provide the image and digital data transmission. A telephone set is connected to the network access card to provide the voice communication.

The network manager 58 at the health care data center 42 is able to configure the information network 40, monitor its status and react to failures and overloads in real time. In particular, the network manager may check the traffic and performance status of the network, activate network communications devices, monitor accounting and billing information, locate bottlenecks, and record information for later analysis and for subscriber accounting. Further, the network manager may perform HCIN administrative functions such as assigning subscriber passwords, managing resource and file access, and billing subscribers. The network manager provides maintenance activity throughout the HCIN that involves detecting and reporting problems and their isolation and resolution. A key element of the HCIN management is configuration management that allows the network manager 58 to identify hardware and software components of the HCIN, including the components of the remote subscriber equipment. The subscriber's software may be modified in response to a problem that arises during the HCIN operation, so as to ensure that the overall network 40 retains its integrity and conforms to requirements. The network manager maintains information on any changes and on the status of each network component. To prevent and detect unauthorized access to the HCIN, the network manager 58 performs network security operations.

Although a subscriber terminal 48 is not directly connected to the central office A having an ISDN Centrex arrangement, it also may be provided with the ISDN Centrex services. For example, the subscriber terminal 48 may be directly connected to the central office B that is not provided with an ISDN Centrex switch. To extend the ISDN Centrex services to the subscriber terminal 48, the central office B may be equipped with a Basic Rate ISDN Transmission Extension (BRITE) unit 80 coupled via T1 line 82 to the ISDN switch 76 at the central office A. An ISDN BRI line 84 is coupled between the subscriber terminal 48 and the BRITE unit 80. The ISDN Centrex services extended from the central office A to the subscriber terminal 48 are supported by a Basic Rate Interface that comprises two B-channels each at 64 Kbps. and one D-channel at 16 Kbps.

Another case is illustrated by a subscriber terminal 50 connected to the central office C that has an ISDN switch 86. Instead of being linked directly to the frame relay network 66, the ISDN switch 86 at the central office C may be connected to the ISDN switch 76 at the central office A via an ISDN public network 88 operating at 64 Kbps. The switches 76 and 86 may be coupled to the network 88 through trunks. This arrangement is particularly advantageous when only a few subscribers of the HCIN 40 are associated with the central office C. In this case, it is impractical to provide the central office C with the arrangement required to communicate with the health care data center 42 via the frame relay network 66.

Figure 3:
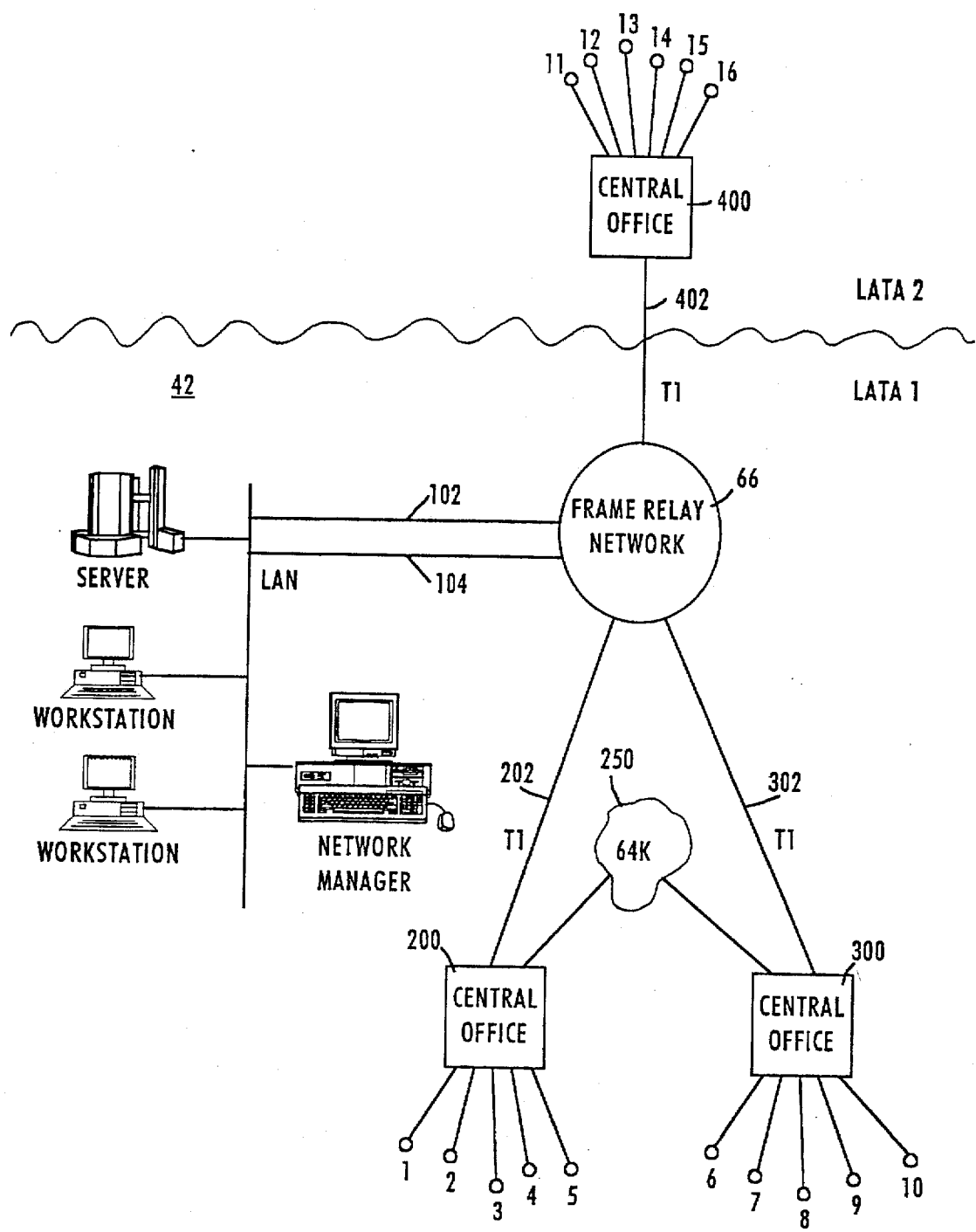
FIG. 3 is a simplified diagram showing interconnection between a data center and central offices.

Referring to FIG. 3, the health care information network 40 may incorporate numerous central offices 200, 300 and 400 each having the ISDN Centrex arrangement similar to the arrangement of the central office A shown in FIG. 2. For the sake of illustration, the subscriber terminals linked to the central offices are shown by locations 1–16. Stations 1–5 are served by central office 200. Stations 6–10 are served by central office 300. Stations 11–16 are served by central office 400. The health care data center 42 may be coupled to the central offices via the frame relay network 66. Frame relay access lines 102 and 104 operating at 1.544 Mbps may be arranged to connect the data center to the frame relay network. IPX multiplexers may be provided to support the frame relay interfaces. The TCP/IP protocol may be used to provide bridging between the data center LAN and the frame relay.

1.544 Mbps. T1 lines link the frame relay network 66 to the central offices that can be located in various Local Access Transport Areas (LATA). As shown in the drawing, central offices 200, 300 and 400 are connected to the Frame Relay Network respectively by lines 202,302 and 402. As exemplified, the central offices 200 and 300 are arranged within LATA 1 while the central office 400 is located in LATA 2. If the frame relay network 66 is arranged in the LATA 1, the T1 line that connects the central office 400 to the frame relay network may be provided by a long distance carrier. From a point of presence in the LATA 1, this line may be extended and connected to the frame relay network.

To provide the HCIN 40 with alternative routine capabilities, the central offices may be connected with each other via 64 Kbps links. For example, the central office 200 may be coupled with the central office 300 via a 64 Kbps public network 250. Accordingly, the subscriber at location 1 can communicate with the subscriber at location 6 without going through the T1 lines to the data center 42 and back. This provides alternative billing capabilities for the HCIN. For example, the subscribers can be provided with a flat rate for communicating with each other within the HCIN. The 64 Kbps. lines allows the subscribers to exchange voice and data signals.

The network access card at the customer's PC can be programmed to allow the customer's access to the data center 42 through one of the frame relay access lines 102 or 104. For example, while customers located within the LATA 1 may access the data center through the frame relay access line 102, customers from the LATA 2 may get through using the line 104. This allows the data center to monitor the source of traffic. However, if one of the frame relay access lines is busy or broken, the customer's network access card may be programmed to automatically dial another number that provides the data center access via another frame relay line. For example, if the normal connection of station 1 cannot be made via central office 200 through T1 line 202, the Public Switched Telephone Network 250 will be used to access the Frame Relay Network through central office 300 and T1 line 302. Also, a reserved number can be programmed into the customer's network access card to provide a customer of one central office with the data center access via another central office in case the main central office or its T1 line to the frame relay network is damaged.

As discussed above, the network manager at the data center 42 may perform the remote programming of the customer's network access card. Accordingly, the HCIN 40 offers multiple configurations for a backup plan in case there is a problem with any portion of the network. Also, it may automatically reconfigure the subscriber's routes to avoid overflow conditions. This capability makes it possible to reduce the cost of the network by eliminating reserve lines that would serve only during overflow periods.

Figure 4:
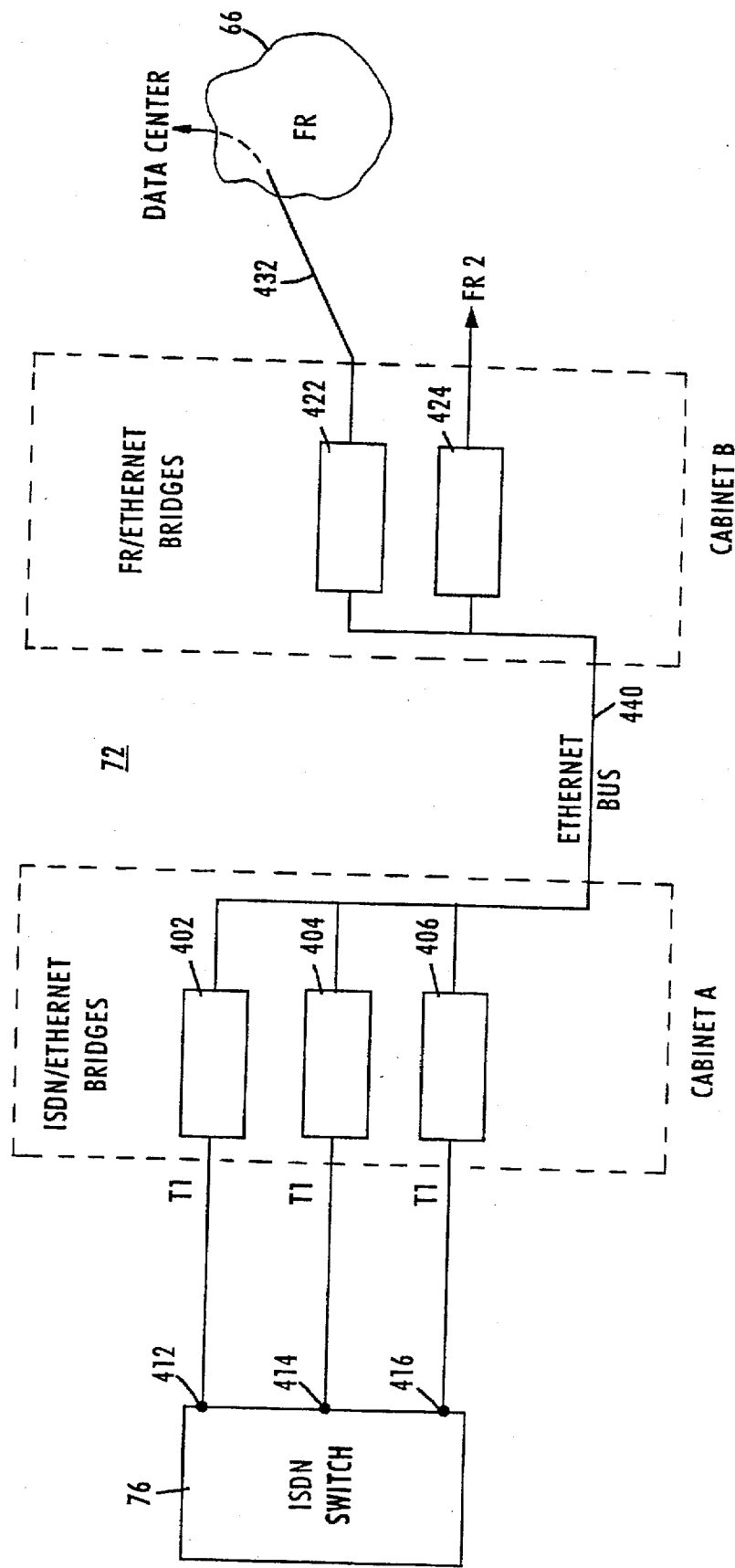
FIG. 4 is a diagram of a backbone Ethernet LAN arrangement for interfacing Frame Relay with ISDN.

Reference is now made to FIG. 4, showing the backbone Ethernet LAN arrangement 72 (FIG. 2) that may be provided at the central office A to interface the frame relay network 66 with the ISDN switch 76. The arrangement may be set up at cabinets A and B. The cabinet A comprises multiple ISDN/Ethernet bridges 402, 404 and 406 respectively coupled to ISDN line terminals 412, 414 and 414 provided at the central office side of the ISDN switch 76. The number of the ISDN/Ethernet bridges corresponds to the number of the ISDN line terminals linked to the bridges through ISDN T1 lines. The ISDN/Ethernet bridges support connections between the Ethernet LAN 72 and ISDN at the physical and data link levels of the Open System Interconnection (OSI) reference model. The cabinet B comprises numerous Frame Relay/Ethernet bridges 422 and 424 that support linking between the Ethernet LAN 72 and frame relay access lines 432 and 434, respectively, at the physical and data link levels of the OSI reference model. Via the frame relay network 66, the frame relay access line 422 may be coupled to the data center 42. The frame relay access line 424 may be coupled to another frame relay network.

To interface the frame relay network with ISDN, the ISDN/Ethernet bridges 402, 404 and 406 and Frame Relay/Ethernet bridges 422 and 424 are arranged using the Ethernet bus topology, wherein the bridges are connected with each other and with other LAN stations through an Ethernet bus 440. The bridges interact with each other and with other LAN stations in accordance with the IEEE 802.3 CSMA/CD standard.

Figure 5:
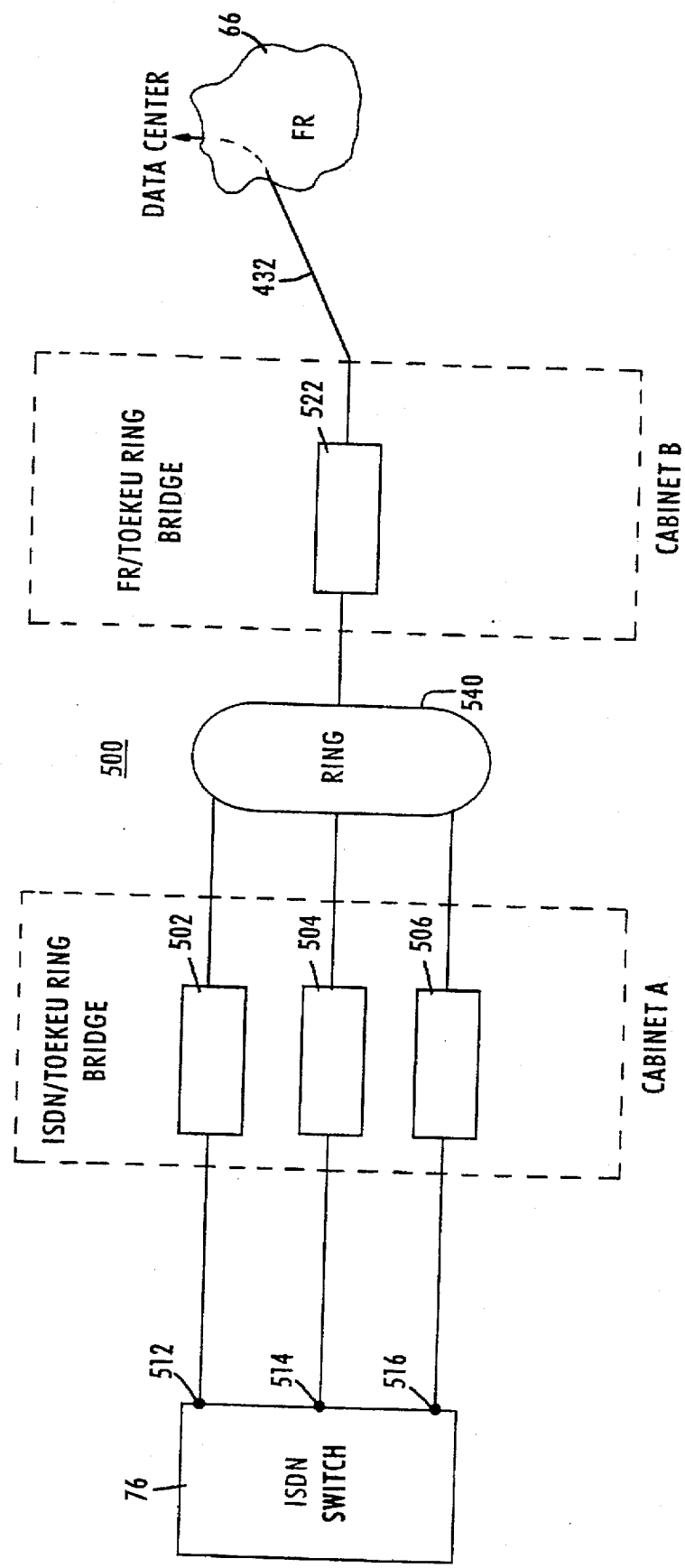
FIG. 5 is a diagram of a backbone Token Ring LAN arrangement for interfacing Frame Relay with ISDN.

FIG. 5 shows another example of interconnection between the frame relay network 66 and ISDN switch 76 via a backbone LAN. At a central office, a Token Ring LAN 500 is arranged having a ring link 540 connected ISDN/Token Ring bridges 502, 504 and 506 with a Frame Relay/Token Ring bridge 522. The ISDN/Token ring bridges 502, 504 and 506 are respectively coupled ISDN line terminals 512, 514 and 516 provided in the ISDN switch 76. The Frame Relay/Token Ring bridge 522 is connected to the data center 42 via the frame relay network 66. The bridges support linking the Token Ring LAN 500 with the ISDN and frame relay network at the physical and data link levels of the OSI reference model. A token-passing access in accordance with the IEEE 802 Token Ring standard is used for the ring bus access and traffic transport between the bridges.

Alternatively, as discussed above, the data center 42 may be connected to the central offices via a Switched Multi-megabit Data Service (SMDS) network that uses fixed 53 byte cells as opposed to variable length frames in a Frame Relay. In this case, the frame relay bridges in cabinet B (FIGS. 4 and 5) are replaced with SMDS routers that support linking between the backbone LAN and SMDS network at the physical, data link and network levels of the OSI reference model.

As described above, a Health Care Information Network allows subscribers access to a data center. A LAN arranged at the data center is connected through a frame relay network to a LAN of a similar type located at a central office. ISDN/LAN bridges link the LAN to an ISDN switch that provides the subscribers with ISDN Centrex services. A PC at the subscriber's site can gain the subscriber access to the ISDN switch via an ISDN Centrex line. The subscribers are provided with voice, image and data transmission, and can communicate not only with the data center but with each other. For disaster recovery, e.g., if a connection is broken or defective, the network can provide alternative routes. A network manager at the data center is able to configure the network, monitor its status and react to failures and overloads on a real time basis. Further, the network manager may perform the network administrative functions such as assigning subscriber passwords, managing resource and file access, and billing subscribers. Maintenance and configuration management can be provided by the network manager throughout the network, including the remote subscriber's equipment.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. A data communications network for providing user terminals with access to a remote data center comprising:

a first local area network (LAN) arranged at said data center, a fast packet network coupled to said first LAN for providing interconnection between said data center and a first central office having a fast packet interface coupled to said fast packet network, an ISDN switch coupled to said user terminals via ISDN lines to provide said user terminals with Centrex services, and a second LAN provided at said first central office for interfacing said fast packet network with said ISDN switch, and having a bus topology including a plurality of devices coupled to a common bus, wherein said fast packet interface comprises a plurality of fast packet bridges coupled to said common bus, and said second LAN is arranged so as to interconnect devices for bridging said second LAN to said ISDN switch, and devices for bridging said second LAN to said fast packet network.

2. The network of claim 1, wherein each of said first and second LANs comprises an Ethernet network.

3. The network of claim 1, wherein each of said first and second LANs comprises a Token Ring network.

4. The network of claim 1, wherein said fast packet network comprises a frame relay.

5. The network of claim 1, wherein said fast packet network comprises a cell relay.

6. The network of claim 1, wherein said data center provides said user terminals with health care management information.

7. The network of claim 1, wherein each of said user terminals are coupled to said ISDN switch via a user basic rate interface (BRI).

8. The network of claim 1, wherein said data center comprises a network manager coupled to said first LAN.

9. The network of claim 8, wherein said network manager has access to each of said user terminals to modify their network interface parameters.

10. The network of claim 1, wherein said user terminals communicate with each other.

11. The network of claim 1, wherein said user terminals receive and transmit image, voice and data signals.

12. The network of claim 1, wherein said ISDN switch is located at said first central office.

13. The network of claim 1 further comprising a second central office having an extension unit coupled to said first central office to extend the Centrex services to customers coupled to said second central office.

14. The network of claim 1 further comprising a third central office having a switch coupled via an ISDN public network to said first central office to provide customers coupled to said switch with access to said data center.

15. The network of claim 1, wherein said data center and fast packet network are located in a first Local Access Transport Area (LATA), and said first central office is located in a second LATA.

16. The network of claim 1, further comprising a fourth central office coupled to said fast packet network.

17. The network of claim 16, wherein said fourth central office comprises an additional ISDN switch connected to an additional LAN coupled to said first LAN via said fast packet network.

18. The network of claim 17, wherein said first and fourth central offices are located in a first LATA.

19. The network of claim 18, further comprising a fifth central office located in a second LATA.

20. The network of claim 19, wherein said first and fourth central offices interact with said data center through a first fast packet line between said data center and said fast packet network, and said fifth central office interacts with said data center through a second fast packet line between said data center and said fast packet network.

21. The network of claim 17, wherein said first and fourth central offices are coupled via a switched network.

22. The network of claim 1, wherein said ISDN switch is coupled to said common bus via a plurality of ISDN bridges.

23. The network of claim 1, wherein each of said user terminals comprises a personal computer having a BRI card.

24. The network of claim 1, wherein topology of said first LAN is similar to topology of said second LAN.

25. The network of claim 1, wherein said data center has the same interconnection arrangement between said first LAN and said fast packet network as an interconnection arrangement between said fast packet network and said second LAN at said first central office.

26. A data communications network for providing user terminals with access to a remote data center comprising:

a first local area network (LAN) arranged at said data center, a fast packet network coupled to said first LAN for providing interconnection between said data center and a first central office having a fast packet interface coupled to said fast packet network, an ISDN switch coupled to said user terminals via ISDN lines to provide said user terminals with Centrex services, and a second LAN provided at said first central office for interfacing said fast packet network with said ISDN switch, and having a ring topology including a plurality of devices coupled to a common ring, wherein said fast packet interface comprises a plurality of fast packet bridges coupled to said common ring, and said second LAN is arranged so as to interconnect devices for bridging said second LAN to said ISDN switch, and devices for bridging said second LAN to said fast packet network.

27. The network of claim 26, wherein said ISDN switch is coupled to said common ring via a plurality of ISDN bridges.

28. A medical information system for providing a plurality of subscribers with access to a health care management center comprising:

a frame relay network coupled to said health care management center, an ISDN switching means for providing the subscribers coupled to said ISDN switch with Centrex services, and a central office having a fast packet interface coupled to said frame relay network and having a central office LAN for interconnecting devices for bridging said central office LAN to said ISDN switching means, and devices for bridging said central office LAN to said frame relay network, wherein said central office LAN has a bus topology including a plurality of devices coupled to a common bus, and said fast packet interface comprises a plurality of fast packet bridges coupled to said common bus.

29. The system of claim 28, wherein said health management center comprises a first LAN coupled to said frame relay network.

30. The system of claim 29, wherein said central office has the same interconnection arrangement between said second LAN and said frame relay network as an interconnection arrangement between said first LAN and said frame relay network at said health care management center.

31. The system of claim 28, wherein said subscribers exchange image, voice and data signals with said health management center and with each other.

32. The system of claim 28, wherein said subscribers are provided with a Centrex speed calling service.

33. The system of claim 28, wherein said subscribers are provided with a Centrex teleconference service.

34. The system of claim 28, wherein said subscribers are provided with a Centrex voice mail service.

35. The system of claim 28, wherein said subscribers are provided with Centrex local and long distance calling services.

36. The system of claim 28, wherein a single data link connection identifier (DLCI) address is assigned to all of the subscribers coupled to said central office.

37. The system of claim 28, wherein each of said subscribers is coupled to said central office via a BRI device.

38. The system of claim 28, wherein said frame relay network is coupled to said data center and central office via T1 circuits.

39. The system of claim 29, wherein topology of said first LAN is similar to topology of said central office LAN.

40. A medical information system for providing a plurality of subscribers with access to a health care management center comprising:

a frame relay network coupled to said health care management center, an ISDN switching means for providing the subscribers coupled to said ISDN switch with Centrex services, and a central office having a fast packet interface coupled to said frame relay network and having a central office LAN for interconnecting devices for bridging said central office LAN to said ISDN switching means, and devices for bridging said central office LAN to said frame relay network, wherein said central office LAN has a ring topology including a plurality of devices coupled to a common ring, and said fast packet interface comprises a plurality of fast packet bridges coupled to said common ring.

* * * * *